(12) United States Patent
Yamamoto

(10) Patent No.: US 7,156,218 B2
(45) Date of Patent: Jan. 2, 2007

(54) PARKING DEVICE FOR VEHICLE

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 163 days.

(21) Appl. No.: 10/521,015

(22) PCT Filed: May 25, 2004

(86) PCT No.: PCT/JP2004/007465

§ 371 (c)(1),
(2), (4) Date: Jan. 12, 2005

(87) PCT Pub. No.: WO2004/106781

PCT Pub. Date: Dec. 9, 2004

(65) Prior Publication Data

US 2005/0223762 A1    Oct. 13, 2005

(30) Foreign Application Priority Data

May 28, 2003   (JP)   ............... 2003-151224

(51) Int. Cl.
*F16H 63/34*   (2006.01)
*B60T 1/06*   (2006.01)

(52) U.S. Cl. .................. 192/219.4; 74/335; 74/411.5

(58) Field of Classification Search ............. 192/219.4, 192/219.5

See application file for complete search history.

(56) References Cited

U.S. PATENT DOCUMENTS 4,987,792 A * 1/1991 Mueller et al. .......... 74/473.12
2006/0163024 A1* 7/2006 Yamamoto ............... 192/219.4

FOREIGN PATENT DOCUMENTS

EP    1251301 A2 * 10/2002

* cited by examiner

*Primary Examiner*—Richard M. Lorence

(57) ABSTRACT

A parking device for vehicles in which when an engine is brought into a halt, a clutch is disconnected and the revolution of an input shaft of a transmission cannot be controlled by frictional force of the engine, the parking device comprising a parking gear provided on the input shaft, a parking lock mechanism which selectively engages with the parking gear, a parking actuator for actuating the parking lock mechanism, a parking instruction device for instructing the parking, a speed-change actuator for shifting the transmission to each gear, and a control device. The control operates the speed-change actuator based on a signal from the parking instruction device to bring the transmission into engagement with a predetermined gear position and, thereafter, operates the parking actuator to bring the parking lock mechanism into engagement with the parking gear.

1 Claim, 2 Drawing Sheets

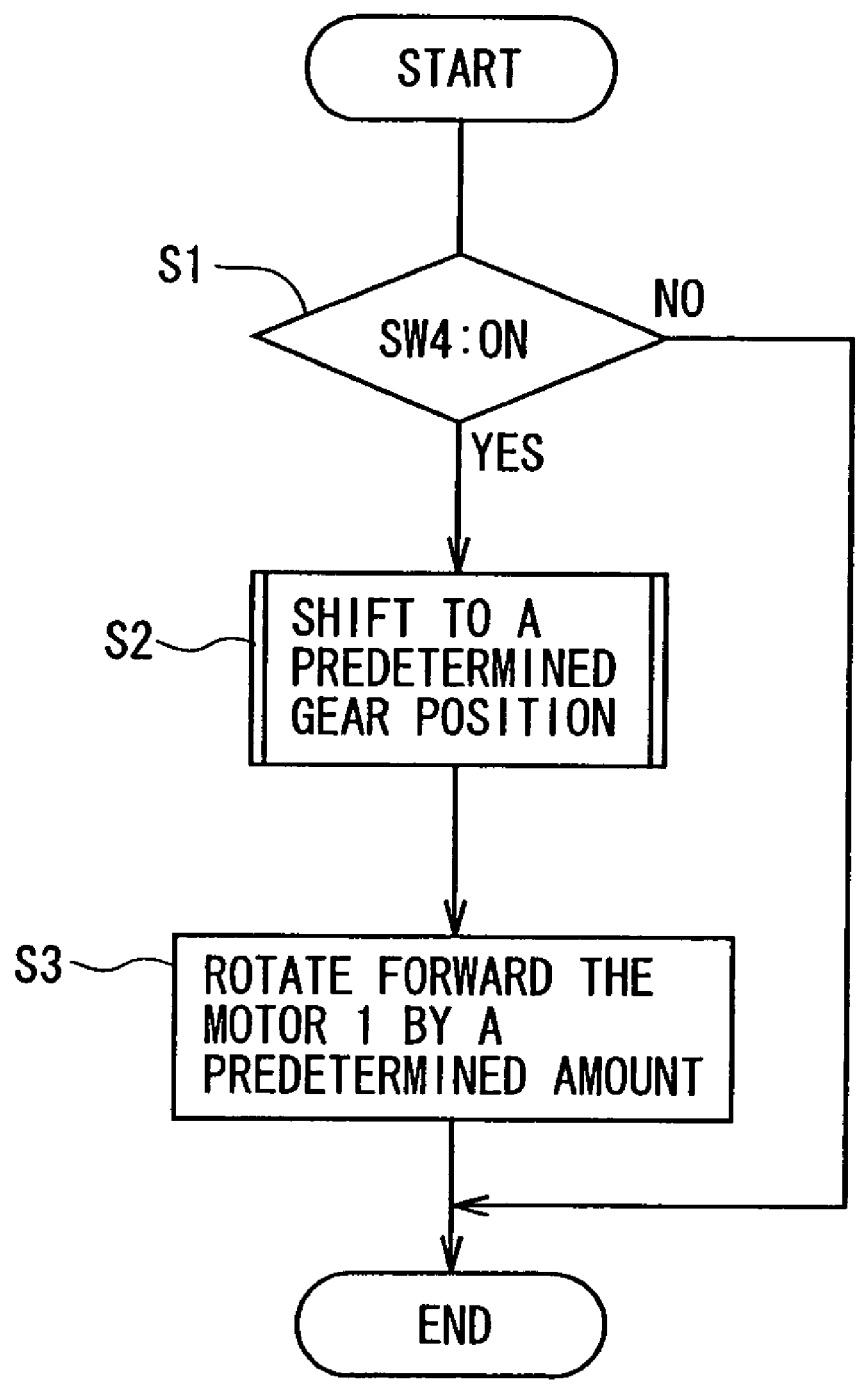

PARKING DEVICE FOR VEHICLE

TECHNICAL FIELD

The present invention relates to a parking device for vehicles in which when an engine is brought into a halt, a clutch is disconnected and hence, the revolution of an input shaft of a transmission cannot be controlled by frictional force of the engine.

BACKGROUND ART

In a vehicle mounting an automatic transmission that comprises a fluid transmission, the vehicle has a structure that a hydraulic pressure is produced by a hydraulic pump driven by an engine, and a multiple-disc clutch is engaged by the hydraulic pressure to secure a gear position. When the engine is brought into a halt, therefore, no hydraulic pressure can be produced and consequently, the transmission automatically becomes a neutral state at the time when the engine is brought into a halt. Therefore, the vehicle mounting the automatic transmission that comprises a fluid transmission is not capable of limiting the rotation of the wheels by utilizing the frictional force of the engine. Therefore, the vehicle mounting the automatic transmission that comprises a fluid transmission has a parking gear that is provided on the output shaft of the transmission and is equipped with a parking lock mechanism, which selectively engages with the parking gear, so that the parking lock mechanism is engaged with the parking gear at the time of parking. When the parking gear provided on the output shaft of the transmission is locked, however, a maximum output torque of the transmission acts on the parking lock mechanism creating a condition, which is very disadvantageous from the standpoint of strength. In the medium- to heavy-sized trucks mounting the automatic transmissions, therefore, the parking lock mechanism is not established from the standpoint of strength and hence, the parking lock mechanism is hardly furnished.

Meanwhile, in the vehicles using a parallel shaft gear type transmission and using a hydraulic multiple-disc clutch or an electromagnetic powder clutch, too, the clutch is disconnected when the engine is brought into a halt and hence, the rotation of the wheels cannot be limited by utilizing the frictional force of the engine. In the vehicles of this type, too, therefore, it can be contrived to provide the output shaft of the transmission with a parking gear and to lock the parking gear at the time of parking. In the medium- to heavy-sized trucks, however, the parking lock mechanism is not established from the standpoint of strength as described above. To solve this problem, JP-A 2000-264178 discloses a parking device for a vehicle having a parking gear provided on the input shaft of the transmission so that the parking gear is locked at the time of parking.

In the parking device described in the above publication, the parking lock mechanism is operated by turning the parking switch on to lock the input shaft of the transmission at the time of parking of the vehicle. After the input shaft of the transmission is locked by the parking lock mechanism, then, the manual transmission is engaged with a predetermined gear position to couple the input shaft of the transmission to the output shaft thereof to limit the rotation of the wheels. However, if the input shaft of the transmission is locked, the gears cannot be engaged unless phases of the teeth of the synchromesh device are in agreement at the time of bringing the manual transmission into engagement with a predetermined gear position. As a result, there arouses a problem in that even if the input shaft is locked, the transmission is placed in the neutral state and hence, the rotation of the wheels is not limited.

DISCLOSURE OF THE INVENTION

It is therefore an object of the present invention to provide a parking device for vehicles, which allows an input shaft of a transmission to be locked after the transmission is engaged with a predetermined gear position at the time of parking.

In order to achieve the above object, according to the present invention, there is provided a parking device for vehicles in which when an engine is brought into a halt, a clutch is disconnected and the revolution of an input shaft of a transmission cannot be controlled by frictional force of the engine, the parking device comprising a parking gear provided on the input shaft, a parking lock mechanism which selectively engages with the parking gear, a parking actuator for actuating the parking lock mechanism, a parking instruction means for instructing the parking, and a speed-change actuator for shifting the transmission to each gear; wherein the parking device further comprises a control means for operating the parking actuator and the speed-change actuator based on a signal from the parking instruction means; and the control means operates the speed-change actuator based on a signal from the parking instruction means to bring the transmission into engagement with a predetermined gear position and, thereafter, operates the parking actuator to bring the parking lock mechanism into engagement with the parking gear.

BRIEF DESCRIPTION OF THE DRAWINGS

FIG. 2 is a flowchart illustrating a procedure of operation of a control means that constitutes the parking device for vehicles, constituted according to the present invention.

BEST MODE FOR CARRYING OUT THE INVENTION

Figure 1:
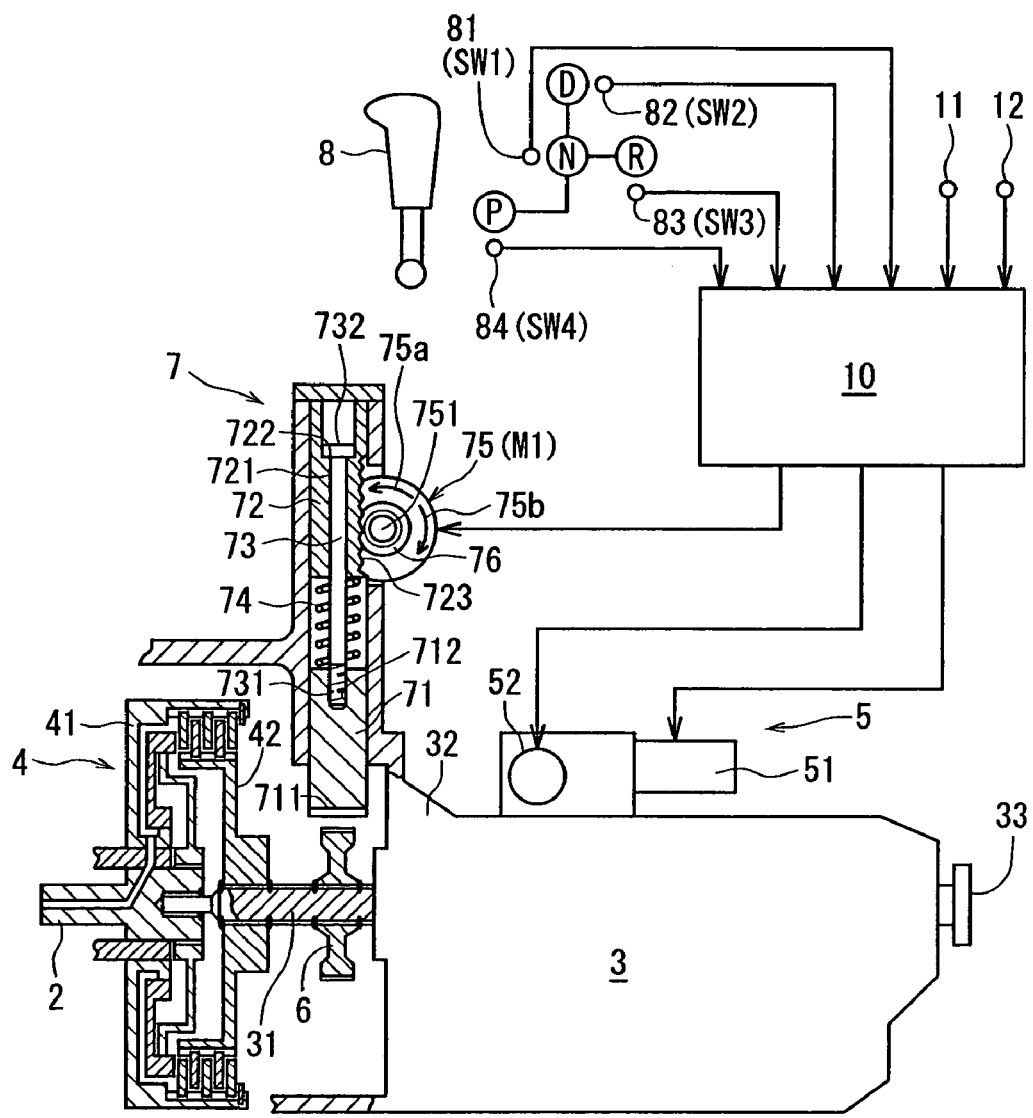
FIG. 1 is a view schematically illustrating the constitution of a parking device for vehicles constituted according to the present invention.

A preferred embodiment of a parking device for vehicles constituted according to the present invention will now be described in further detail with reference to the accompanying drawings.

FIG. 1 is a view schematically illustrating the constitution of a parking device for vehicles according to the present invention. A drive shaft 2 driven by an engine (not shown) such as an internal combustion engine and an input shaft 31 of a transmission 3 are arranged on the same axis. A hydraulic multiple-disc clutch 4 is arranged between the drive shaft 2 and the input shaft 31. The hydraulic multiple-disc clutch 4 may be constituted by a clutch outer 41 mounted on the drive shaft 2 and a clutch inner 42 mounted on the input shaft 31 in a customary manner. The transmission 3 is a known parallel shaft gear type transmission and is so constituted as to be brought into engagement with each gear by a speed-change actuator 5. The speed-change actuator 5 may be the known one comprising a select actuator 51 and a shift actuator 52 which are constituted, for example, by electric motors, and is actuated by a speed-change instruction signal sent from control means that will be described later.

A parking gear 6 is mounted on the input shaft 31 of the transmission 3. The parking gear 6 is so designed to selectively engage with a parking lock mechanism 7. The parking lock mechanism 7 has an engaging member 71 that is arranged facing the outer periphery of the parking gear 6 and is supported by a casing 32 of the transmission 3 so as to slide in the up and down direction in the drawing, and an operation member 72 which is arranged on the upper side of the engaging member 71 in the drawing so as to slide in the up and down direction. The engaging member 71 has, at a lower end thereof, teeth 711 to engage with the parking gear 6, and has, at an upper end thereof, an internally threaded portion 712. The operation member 72 has a through-hole 721 penetrating in the up and down direction in the central portion thereof. The through-hole 721 has a large diameter in the upper portion thereof and has a step portion 722. A rack 723 is formed on the outer periphery of the operation member 72 in the up-and-down direction. A coupling rod 73 is arranged between the engaging member 71 and the operation member 72. The coupling rod 73 has, at a lower end thereof, an externally threaded portion 731 to engage with the internally threaded portion 712 formed in the engaging member 71, and has a stopper 732 provided at an upper end thereof. The thus formed coupling rod 73 is inserted in the through-hole 721 formed in the operation member 72 from the upper side, and is screwed at its externally threaded portion 731 into the internally threaded portion 712 formed in the engaging member 71 so as to be coupled to the engaging member 71. A coil spring 74 is arranged between the engaging member 71 and the operation member 72. The spring force of the coil spring 74 urges the engaging member 71 and the operation member 72 in a direction in which they separate away from each other.

The parking lock mechanism 7 according to the illustrated embodiment has an electric motor 75 (M1) that is a parking actuator for operating the operation member 72. The electric motor 75 (M1) is constituted to revolve forward or reverse, and has a pinion 76 mounted on a drive shaft 751 thereof. The pinion 76 is in mesh with the rack 723 provided on the outer periphery of the operation member 72. When the electric motor 75 (M1) revolves forward by a predetermined amount in a direction indicated by an arrow 75a in the drawing, the operation member 72 moves down in the drawing due to the operation of the pinion 76 mounted on the drive shaft 751 of the electric motor 75 (M1) and the rack 723 in mesh with the pinion 76, whereby the engaging member 71 moves down via the coil spring 74 and consequently, the teeth 711 formed at the lower end of the engaging member 71 come into engagement with the parking gear 6. On the other hand, when the electric motor 75 (M1) is rotated reverse by a predetermined amount in a direction indicated by an arrow 75b in the drawing in a state where the teeth 711 formed at the lower end of the engaging member 71 is engaged with the parking gear 6, the operation member 72 moves up in the drawing due to the operation of the pinion 76 mounted on the drive shaft 751 of the electric motor 75 (M1) and the rack 723 in mesh with the pinion 76, whereby the step portion 722 of the operation member 72 engages with the stopper 732 of the coupling rod 73, and the engaging member 71 coupled to the coupling rod 73 moves up to release the engagement between the parking gear 6 and the teeth 711 formed at the lower end of the engaging member 71 as shown in FIG. 1.

In the illustrated embodiment, the device has a change lever 8 for instructing the gear position of the transmission 3 and the parking position. The change lever 8 can be moved to a neutral position (N), drive position (D), reverse position (R) and parking position (P) in conformity with the operation pattern that is illustrated. Detector means are each provided at the respective operation positions of the change lever 8. Namely, a neutral position detector means 81 (SW1) is provided at the neutral position (N), a drive position detector means 82 (SW2) is provided at the drive position (D), a reverse position detector means 83 (SW3) is provided at the reverse position (R), and a parking position detector means 84 (SW4) is provided at the parking position (P). These detector means send their detection signals to a control means that will be described later. In the illustrated embodiment, therefore, the change lever 8 and the parking position detector means 84 (SW4) work as a parking instruction means for instructing the parking.

The parking device of the illustrated embodiment has a control means 10. The control means is constituted by a microcomputer, and has a central processing unit (CPU) for executing an arithmetic processing according to a control program, a read-only memory (ROM) for storing the control program, a read-write random access memory (RAM) for storing the operated results, a timer and the like. The control means 10 receives detection signals from the neutral position detector means 81 (SW1), drive position detector means 82 (SW2), reverse position detector means 83 (SW3), parking position detector means 84 (SW4), a vehicle speed sensor 11 for detecting the traveling speed of the vehicle and an accelerator sensor 12 for detecting the amount of the accelerator pedal (not shown) depressed. The control means 10 sends control signals to the select actuator 51 and the shift actuator 52 that constitute the speed-change actuator 5, and to the electric motor 75 (M1) of the parking lock mechanism 7.

The parking device of the illustrated embodiment is constituted as described above. Described below is the operation thereof.

When the change lever 8 is operated to the neutral position (N), the control means 10 sends a control signal to the select actuator 51 and the shift actuator 52 constituting the speed-change actuator 5 based on a detection signal from the neutral position detector means 81 to place the transmission 3 in the neutral state. When the change lever 8 is positioned to the drive position (D), the control means 10 executes an automatic speed-change control based on a detection signal from the drive position detector means 82. That is, the control means 10 determines a target gear position based on the detection signals from the vehicle speed sensor 11 and the accelerator sensor 12, and sends control signals to the select actuator 51 and to the shift actuator 52 so that the transmission is brought into engagement with the target gear position that has been determined. Next, when the change lever 8 is positioned to the reverse position (R), the control means 10 sends control signals to the select actuator 51 and to the shift actuator 52 based on a detection signal from the reverse position detector means 83 so that the transmission 3 is brought into engagement with the reverse gear position.

Next, described below is a case where the vehicle comes to a halt and parks.

When the vehicle is to be brought into a halt, the change lever 8 has been positioned to the neutral position (N). Here, when the parking device is to be operated, the hydraulic multiple-disc clutch 4 that works through the hydraulic pressure produced by a hydraulic pump operated by a driving force of the engine is in a state where the transmission of power is interrupted, since the engine is not running. When the parking device is to be operated to park the vehicle, the change lever 8 is operated to the parking position (P). Hereinafter, the operation of the parking device will be described with reference also to a flowchart of FIG. 2.

The control means 10 at step S1 checks whether the parking position detector means 84 (SW4) is turned on. When the parking position detector means 84 (SW4) has not been turned on, the control means 10 determines that the change lever 8 has not been positioned to the parking position (P) and hence, there is no need of operating the parking device and ends the routine. When the parking position detector means 84 (SW4) is turned on at step S1, the control means 10 proceeds to step S2 and executes the speed-change control to shift the transmission 3 to a predetermined gear position (e.g., first speed gear or second speed gear). That is, the control means 10 sends control signals to the select actuator 51 and to the shift actuator 52 constituting the speed-change actuator 5 to bring the transmission 3 into engagement with a predetermined gear position (e.g., first speed gear or second speed gear). As a result, the transmission 3 is placed in a state where it is engaged with the predetermined gear position (e.g., first speed gear or second speed gear). At this moment, since the hydraulic multiple-disc clutch 4 is in a state where the transmission of power has been interrupted as described above, the input shaft 31 of the transmission 3 is allowed to rotate, and the gear can be smoothly brought into engagement.

When the transmission 3 is shifted to a predetermined gear (e.g., first speed gear or second speed gear) at step S2, the control means 10 proceeds to step S3 to produce a control signal for rotating the electric motor 75 (M1) forward by a predetermined amount. As a result, the electric motor 75 (M1) is driven in a direction indicated by the arrow 75*a* in the drawing, and the operation member 72 moves downward in FIG. 1 due to the operation of the pinion 76 mounted on the drive shaft 751 and the rack 723 in mesh with the pinion 76. When the operation member 72 moves downward, the engaging member 71 moves downward via the coil spring 74, whereby the teeth 711 formed at the lower end of the engaging member 71 are brought into engagement with the parking gear 6. As the teeth 711 of the engaging member 71 are engaged with the parking gear 6, the input shaft 31 of the transmission 3 is locked and its rotation is limited. Thus, when the transmission 3 is engaged with the predetermined gear position (e.g., first speed gear or the second speed gear) and the input shaft 31 of the transmission 3 is locked, rotation of the wheels (not shown) drivingly coupled to the output shaft 33 of the transmission is limited and the vehicle is placed in the parking state.

When the change lever 8 has not been operated to the parking position (P) even the vehicle has been halted and the engine key is turned off, turning off of the power source for the parking device must be delayed by a predetermined period of time. And, the power source for the parking device is turned off after the change lever 8 is operated to the parking position (P) within a predetermined period of time and the transmission 3 is brought into engagement with a predetermined gear position due to the select actuator 51 and the shift actuator 52 that constitute the speed-change actuator 5. In a case where the change lever 8 is not operated to the parking position (P) within the predetermined period of time, it is recommended to produce an alarm by energizing a buzzer or the like.

According to the parking device of the present invention constituted as described above, the speed-change actuator is driven based on a signal from the parking instruction means to bring the transmission into engagement with a predetermined gear position and, then, the parking actuator is energized to bring the parking lock mechanism into engagement with the parking gear. Therefore, the transmission can be reliably brought into engagement with a predetermined gear position prior to bringing the parking gear into engagement with the parking lock mechanism preventing such an occurrence that the vehicle is parked with the transmission in a state of being placed in the neutral state.

The invention claimed is:

1. A parking device for vehicles in which when an engine is brought into a halt, a clutch is disconnected and the revolution of an input shaft of a transmission cannot be controlled by frictional force of the engine, said parking device comprising a parking gear provided on said input shaft, a parking lock mechanism which selectively engages with said parking gear, a parking actuator for actuating said parking lock mechanism, a parking instruction means for instructing the parking, and a speed-change actuator for shifting the transmission to each gear; wherein the parking device further comprises a control means for operating said parking actuator and said speed-change actuator based on a signal from said parking instruction means; and said control means operates said speed-change actuator based on a signal from the parking instruction means to bring the transmission into engagement with a predetermined gear position and, thereafter, operates said parking actuator to bring said parking lock mechanism into engagement with said parking gear.

* * * * *